US007441428B2

(12) United States Patent
Chang et al.

(10) Patent No.: US 7,441,428 B2
(45) Date of Patent: Oct. 28, 2008

(54) LATCH LOCKING APPARATUS FOR A FRAMELESS GLASS DOOR

(75) Inventors: Wei-Hung Chang, Taichung (TW); Ching-Ko Lin, Taichung (TW)

(73) Assignee: Door & Window Hardware Co. (TW)

( * ) Notice: Subject to any disclaimer, the term of this patent is extended or adjusted under 35 U.S.C. 154(b) by 0 days.

(21) Appl. No.: 11/702,562

(22) Filed: Feb. 6, 2007

(65) Prior Publication Data

US 2008/0072635 A1 Mar. 27, 2008

(30) Foreign Application Priority Data

Sep. 21, 2006 (TW) ............................. 95135006 A

(51) Int. Cl.
*B60R 25/02* (2006.01)

(52) U.S. Cl. ............................. 70/210; 70/95; 292/163; 292/167; 292/139

(58) Field of Classification Search ..................... 70/95, 70/99, 100, 210; 292/137, 139, DIG. 46, 292/163, 165–167, 169.14
See application file for complete search history.

(56) References Cited

U.S. PATENT DOCUMENTS

| | | | | |
|---|---|---|---|---|
| 4,138,869 | A * | 2/1979 | Pelcin | 70/151 R |
| 4,593,542 | A * | 6/1986 | Rotondi et al. | 70/134 |
| 6,023,953 | A * | 2/2000 | Vickers et al. | 70/208 |
| 6,381,909 | B1 * | 5/2002 | Liao | 52/204.58 |
| 6,578,888 | B1 * | 6/2003 | Fayngersh et al. | 292/332 |
| 6,619,705 | B2 * | 9/2003 | Dalsing | 292/169.14 |
| 6,733,049 | B2 * | 5/2004 | Piorkowski et al. | 292/139 |
| 6,733,050 | B1 * | 5/2004 | Yao | 292/169 |
| 6,931,897 | B2 * | 8/2005 | Talpe | 70/210 |
| 7,032,417 | B2 * | 4/2006 | Toulis et al. | 70/97 |
| 7,155,945 | B2 * | 1/2007 | Talpe, Jr. | 70/107 |
| 7,188,870 | B2 * | 3/2007 | Huang | 292/163 |
| 2003/0173785 | A1 * | 9/2003 | Huang et al. | 292/1.5 |
| 2006/0185405 | A1 * | 8/2006 | Middleton | 70/134 |
| 2007/0113602 | A1 * | 5/2007 | Watts | 70/107 |
| 2007/0158952 | A1 * | 7/2007 | Huang | 292/163 |

* cited by examiner

*Primary Examiner*—Suzanne D Barrett
(74) *Attorney, Agent, or Firm*—Hershkovitz & Associates, LLC; Abe Hershkovitz

(57) ABSTRACT

A latch locking apparatus for a glass door has a body, an operating member, a transmitting device and a lock device. The body has a casing with a mounting hole and a lower mounting post. The operating member is mounted in the casing and has a pulling arm, a mounting post and a first spring. The mounting post is formed on the pulling arm. The transmitting device is mounted in the casing and has a latch plate, a transmitting lever and a pulling bar. The latch plate is mounted in the casing and has a second spring. The transmitting lever is connected to the latch plate. The pulling bar is connected to the transmitting lever and has a third spring. The lock device is connected to the body and the operating member.

7 Claims, 11 Drawing Sheets

LATCH LOCKING APPARATUS FOR A FRAMELESS GLASS DOOR

BACKGROUND OF THE INVENTION

1. Field of the Invention

The present invention relates to a latch locking apparatus, and more particularly relates to a latch locking apparatus with handle and key for frameless glass door locking and opening.

2. Description of Related Art

With reference to FIG. 11, a conventional glass locking apparatus (60) is mounted on a bottom or a middle of a glass door to lock the glass door to prevent unauthorized access to a room. The conventional glass locking apparatus usually has a body (61), a lock device (63) and a bolt (64). The body (61) has two mounting slabs and two connecting blocks (62). The mounting slabs are connected against the glass door. Each connecting block (62) is formed on the mounting slab opposite the glass door and has a mounting hole. The mounting hole is formed through the connecting block (62) and a corresponding mounting slab. The lock device (63) is defined in the mounting hole and connected to the body (61), is applied with a key for locking or unlocking the glass door. The bolt (64) is movably mounted in the body (61) between the two mounting slabs, is driven by the lock device (63).

However, the conventional glass locking apparatus has the following shortcomings.

1. Users cannot hold the glass door in a close position unless the conventional glass locking apparatus is locked.

2. In general, a user can rotate the key with the lock device (63) to lock or unlock the glass door. However, user cannot open or close the glass door by a handle, and it is inconvenient in use.

SUMMARY OF THE INVENTION

The main objective of the present invention is to provide a latch locking apparatus that used on a frameless glass door to lock the glass door quickly and safely.

The latch locking apparatus for a frameless glass door has a body, an operating member, a transmitting device and a lock device. The body has a casing with a mounting hole and a lower mounting post. The operating member is mounted in the casing and has a pulling arm, a mounting post and a first spring. The mounting post is formed on the pulling arm. The transmitting device is mounted in the casing and has a latch plate, a transmitting lever and a pulling bar. The latch plate is mounted in the casing and has a second spring. The transmitting lever is connected to the latch plate. The pulling bar is connected to the transmitting lever and has a third spring. The lock device is connected to the body and the operating member.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
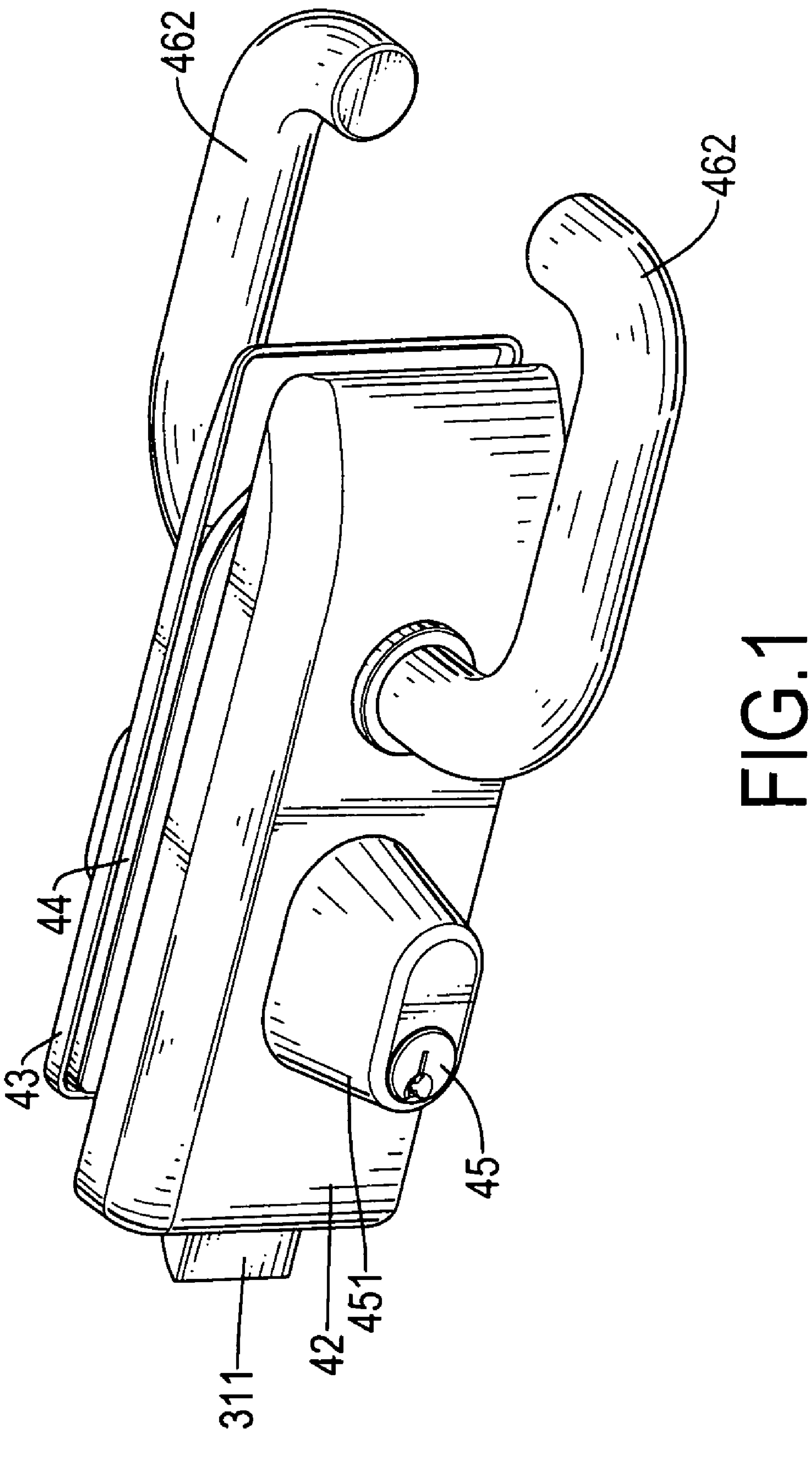
FIG. 1 is a perspective view of a latch locking apparatus for a frameless glass door in accordance with the present invention.
Figure 2:
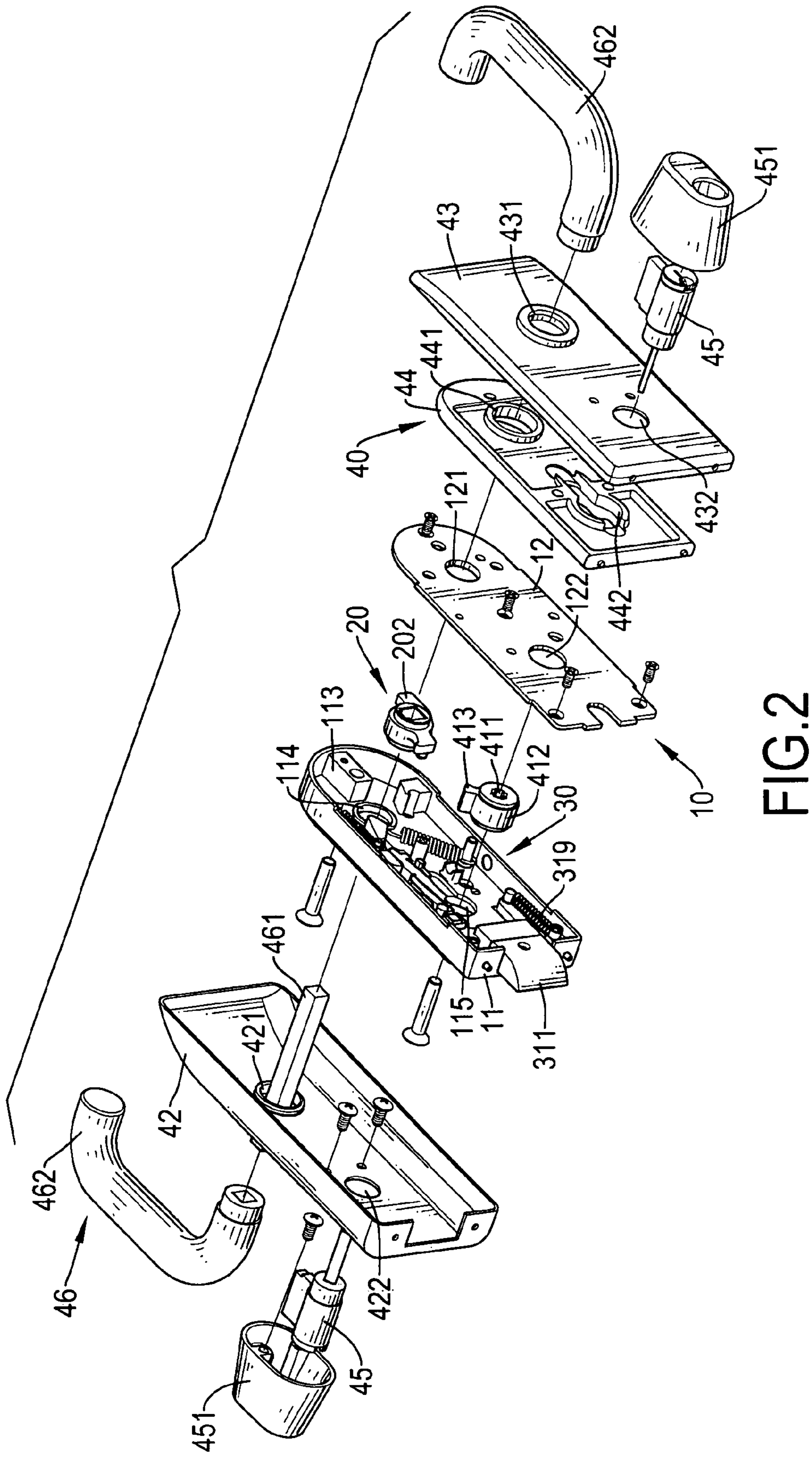
FIG. 2 is an exploded perspective view of the latch locking apparatus in FIG. 1.
Figure 3:
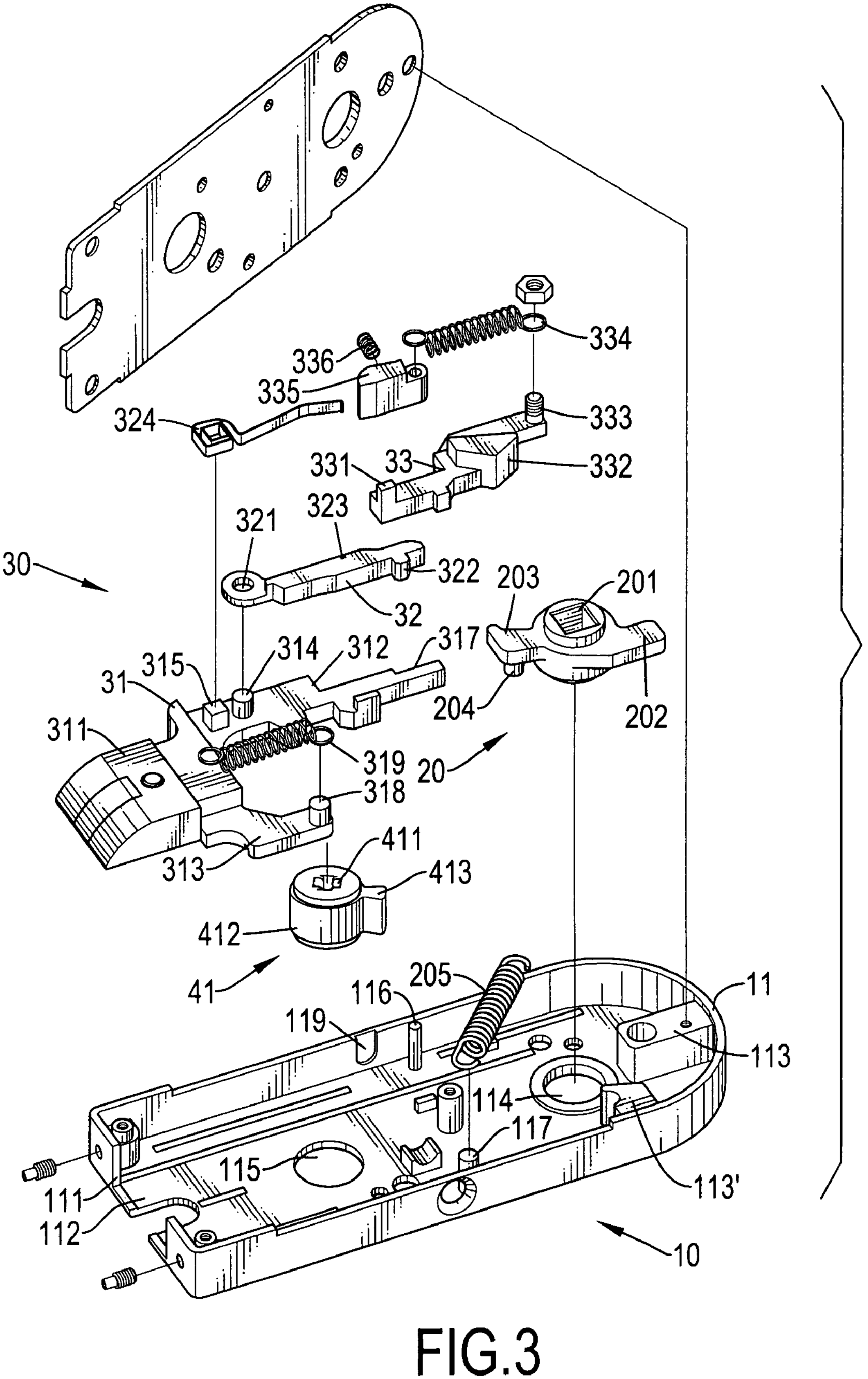
FIG. 3 is an enlarged exploded perspective view of the latch locking apparatus in FIG. 2.
Figure 4:
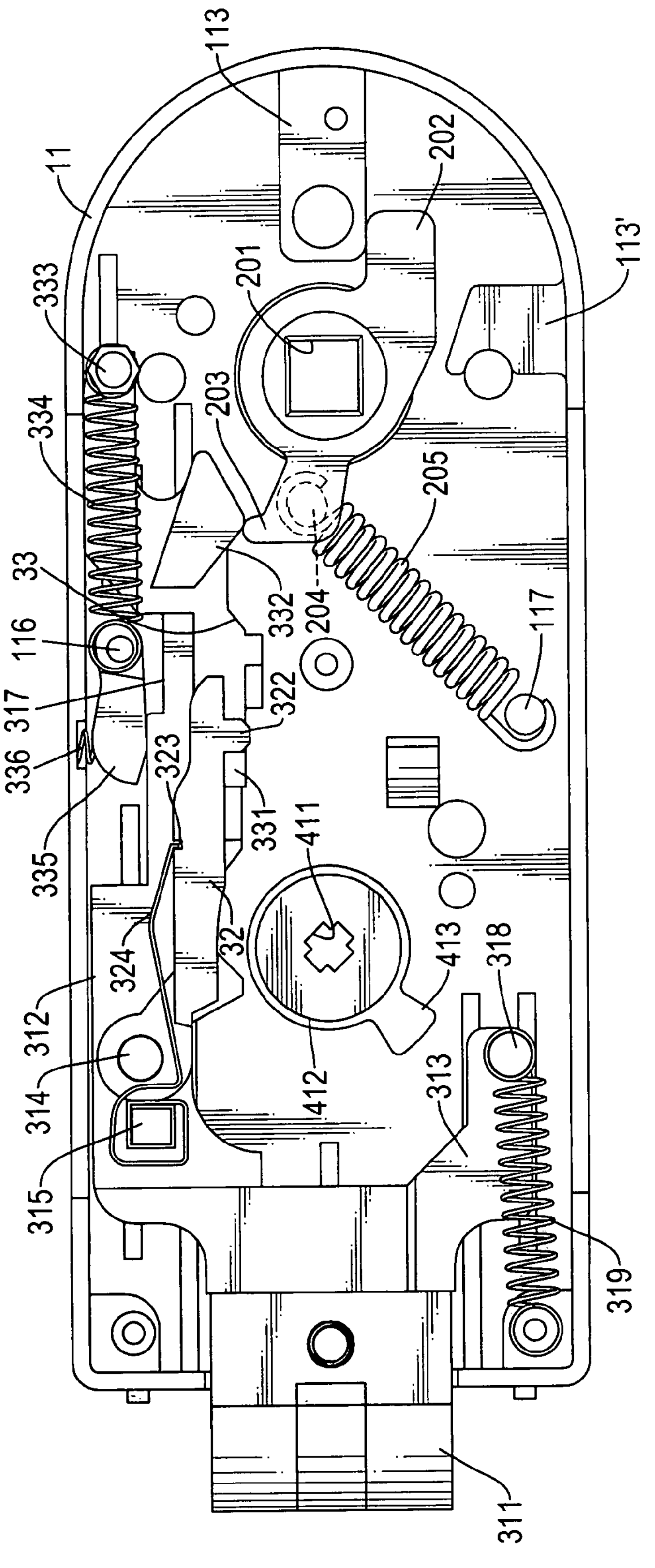
FIG. 4 is a top perspective view of the latch locking apparatus in FIG. 1 with the cover being removed.
Figure 5:
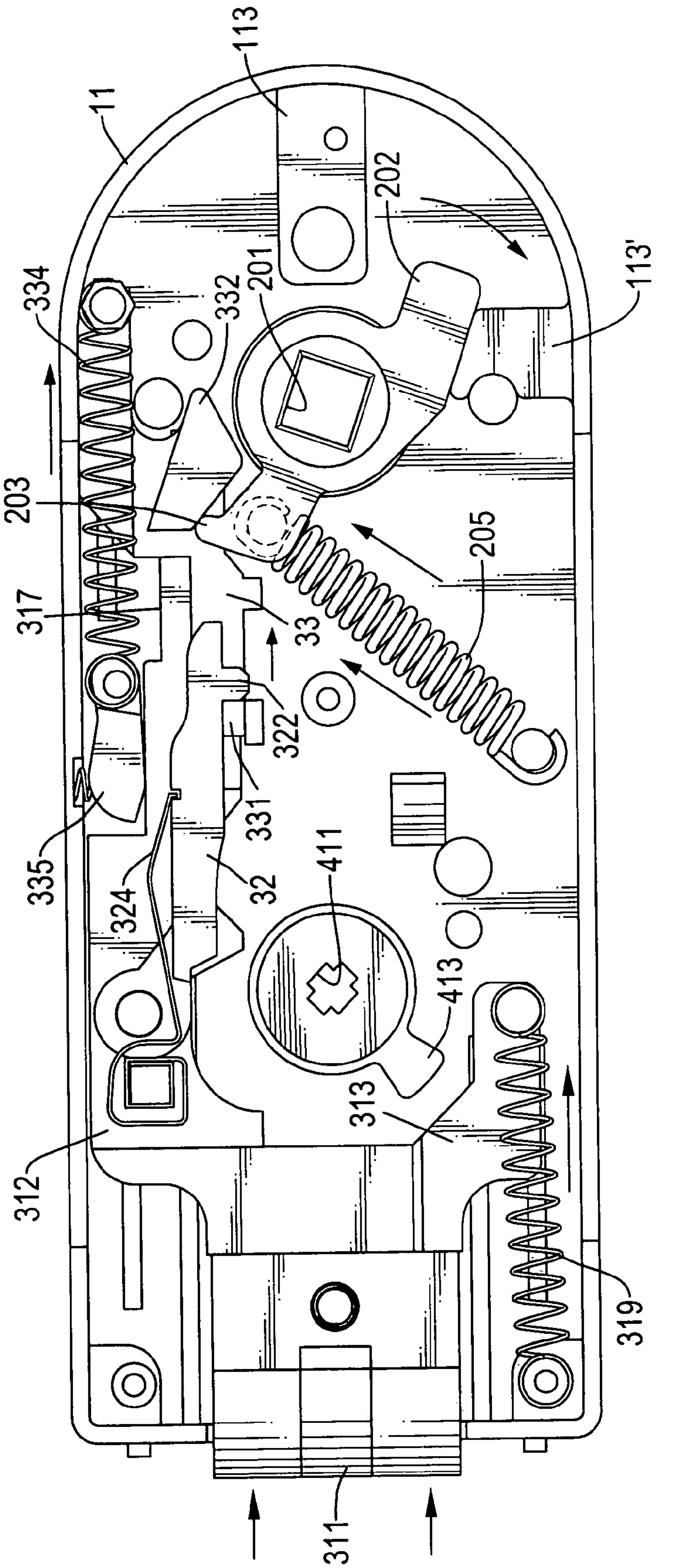
FIG. 5 is an operational top view of the latch locking apparatus in FIG. 4 showing the operating member of the latch locking apparatus being rotated.

With reference to FIGS. 1 to 4, a latch locking apparatus in accordance with the present invention is used on a glass door and comprises a body (10), an operating member (20), a transmitting device (30) and a lock device (40).

The body (10) is attached to the glass door and has a casing (11) and a cover (12). The casing (11) is attached to the glass door and has an open top, a closed bottom, an upper sidewall, a lower sidewall, a distal end, a proximal end, a chamber (112), an opening (111), an upper restricting block (113), a lower restricting block (113'), a mounting hole (114), a connecting hole (115), an upper mounting post (116), a lower mounting post (117) and a recess (119).

The chamber (112) is defined in the casing (11) between the open top and the closed bottom.

The opening (111) is formed through the distal end of the casing (11) and communicates with the chamber (112).

The upper restricting block (113) is formed on the closed bottom of the casing (11) at the proximal end of the casing (11).

The lower restricting block (113') is formed on the closed bottom of the casing (11) on the lower sidewall.

The mounting hole (114) is formed through the closed bottom of the casing (11) near the restricting block (113, 113').

The connecting hole (115) is formed through the closed bottom of the casing (11) between the opening (111) and the mounting hole (114).

The upper mounting post (116) is formed on the closed bottom of the casing (11) near the upper sidewall and between the mounting hole (114) and the connecting hole (115).

The lower mounting post (117) is formed on the closed bottom of the casing (11) near the lower sidewall and between the mounting hole (114) and the connecting hole (115).

The recess (119) is defined in the upper sidewall of the casing (11) near the upper mounting post (116).

The cover (12) is attached to and closes the open top of the casing (11) and has a through hole (121) and a connecting hole (122). The through hole (121) is formed through the cover (12) and aligns with the mounting hole (114) in the casing (11). The connecting hole (122) is formed through the cover (12) and aligns with the connecting hole (115) in the casing (11).

The operating member (20) is mounted rotatably in chamber (112) of the body (10) and has a center, a rear end, a front end, a mounting hole (201), a restricting arm (202), a pulling arm (203), a mounting post (204) and a first spring (205).

The mounting hole (201) is formed through the center of the operating member (20) and aligns with the mounting hole (114) in the casing (11) and the through hole (121) in the cover (12). In a preferred embodiment, a handle is inserted through the through hole (121) in the cover (12), the mounting hole (201) of the operating member (20) and the mounting hole (114) in the casing (11) and is connected to the body (10) and the operating member (20).

The restricting arm (202) is formed on the rear end of the operating member (20) and is located between the restricting blocks (113, 113') on the casing (11). The pulling arm (203) is formed on and protrudes from the front end of the operating member (20) opposite to the restricting arm (202) and has a bottom. The mounting post (204) is formed on and protrudes from the bottom of the pulling arm (203) and extends to a position near the closed bottom of the casing (11). The first spring (205) is connected to the mounting post (204) in the pulling arm (203) and the lower mounting post (117) in the casing (11).

The transmitting device (30) is mounted in chamber (112) of the body (10), is connected to the operating member (20) and has a latch plate (31), a transmitting lever (32) and a pulling bar (33).

The latch plate (31) is mounted moveably in the chamber (112), abuts with the closed bottom of the casing (11) and has a latch end, a mounting end, a latch head (311), an upper tail (312), a lower tail (313) and a second spring (319).

The latch head (311) is formed on the latch end of the latch plate (31) and extends out the casing (11) from the opening (111). The mounting end of the latch plate (31) may be U-shaped.

The upper tail (312) is formed on the mounting end of the latch plate (31) at a position near the upper sidewall of the casing (11) and has a top, a distal end, an upper connecting post (314), a mounting protrusion (315) and a latch recess (317). The upper connecting post (314) is formed on the top of the upper tail (312). The mounting protrusion (315) is formed on the top of the upper tail (312) between the upper connecting post (314) and the latch head (311). The latch recess (317) is formed in the distal end of the upper tail (312) and faces to the recess (119) in the casing (11).

The lower tail (313) is formed on the mounting end of the latch plate (31) at a position near the lower sidewall of the casing (11) and has a top, a distal end and a lower connecting post (318). The lower connecting post (318) is formed on the top of the lower tail (313) near the distal end.

The second spring (319) is connected to body (10) and the lower connecting post (318) on the lower tail (313).

The transmitting lever (32) is attached to the latch plate (31), is located near the upper sidewall of the casing (11) and has a proximal end, a distal end, a lower side, an upper side, a connecting hole (321), a holding block (322), an inserting recess (323) and a resilient member (324). The proximal end of the transmitting lever (32) is connected to the upper connecting post (314) of the upper tail (312). The connecting hole (321) is formed in the proximal end of the transmitting lever (32) and is mounted around the upper connecting post (314).

The holding block (322) is formed on the lower side of the transmitting lever (32). The inserting recess (323) is formed in the upper side of the transmitting lever (32) and faces to the upper sidewall of the casing (11). The resilient member (324) is connected to the mounting protrusion (315) on the upper tail (312) and the inserting recess (323) in the transmitting lever (32).

The pulling bar (33) is mounted in the chamber (112) of the casing (11), abuts with the transmitting lever (32) and the operating member (20) and has a distal end, a proximal end, a pulling block (331), a pressing block (332), a mounting shaft (333), a third spring (334), an engaging block (335) and a spring (336).

The pulling block (331) is formed on the distal end of the pulling bar (33) and abuts with the holding block (322) of the transmitting lever (32). The pressing block (332) is formed on the pulling bar (33) and abuts with the pulling arm (203) of the operating member (20). The mounting shaft (333) is formed on the proximal end of the pulling bar (33). The third spring (334) is connected between the mounting shaft (333) on the pulling bar (33) and the upper mounting post (116) on the casing (11). The engaging block (335) is connected to the upper mounting post (116) in the casing (11) and selectively engages with the upper tail (312) of the latch plate (31). The spring (336) is mounted in the recess (119) in the casing (11) and presses against the engaging block (335) to engage with the upper tail (312) of the latch plate (31).

The lock device (40) is connected to the body (10) and the operating member (20) and has a lock cam (41), a primary housing (42), a second housing (43), a connecting slab (44), two lock cylinders (45) and a handles device (46).

The lock cam (41) is connected to the body (10) in the connecting hole (115) of the casing (11) and the connecting hole (122) in the cover (12) and has a center, a through hole (411), a rotating ring (412) and a locking protrusion (413). The through hole (411) is formed through the center of the lock cam (41). The rotating ring (412) is mounted rotatably on the lock cam (41) and abuts the closed bottom of the casing (11). The locking protrusion (413) is formed on the rotating ring (412) and selectively abuts with the upper tail (312) of the latch plate (31) or the transmitting lever (32) of the transmitting device (30) when the rotating ring (412) is rotated by a key.

The primary housing (42) is mounted around the closed bottom of the casing (1) of the body (10) and has a mounting hole (421) and a connecting hole (422). The mounting hole (421) is formed through the primary housing (42) and aligns with the mounting hole (114) in the casing (11). The connecting hole (422) is formed through the primary housing (42) and aligns with the connecting hole (115) in the casing (11).

The second housing (43) is mounted around the cover (12) of the body (10) and has a mounting hole (431) and a connecting hole (432). The mounting hole (431) is formed through the second housing (43) and aligns with the through hole (121) in the cover (12). The connecting hole (432) is formed through the second housing (42) and aligns with the connecting hole (122) in the cover (12).

The connecting slab (44) is connected to the body (10) between the cover (12) and the second housing (43) and has a mounting hole (441) and a connecting hole (442). The mounting hole (441) is formed through the connecting slab (44) and aligns with the through hole (121) in the cover (12) and the mounting hole (431) in the second housing (43). The connecting hole (442) is formed through the connecting slab (44) and aligns with the connecting holes (122, 432) in the cover (12) and the second housing (43).

The lock cylinders (45) are respectively mounted securely in the housings (42, 43) and each lock (45) has an inner end, an outer end and a cap (451). The inner ends of the lock cylinders (45) are respectively extended into the connecting holes (422, 432) of the housings (42, 43), are connected to each other and are connected to the through hole (411) of the lock cam (41). The caps (451) are respectively mounted around the outer ends of the lock cylinders (45), are respectively connected to the housings (42, 43).

The handle device (46) is attached to the housings (42, 43), the body (10) and the operating member (20) and has a mounting post (461) and two handles (462). The mounting post (461) is extended through the mounting holes (421, 431, 441, 114, 201) of the housings (42, 43), the connecting slab (44), the casing (11) and the operating member (20) and the through hole (121) of the cover (12) and has two ends. Each handle (462) has a proximal end and a distal end. The proximal ends of the handles are respectively connected to the ends of the mounting post (461) to rotate the operating member (20).

When a user rotates the distal ends of the handles (462) with hands to open the glass door, the operating member (20) is rotated in clockwise and the pulling arm (203) presses against the pressing block (332) to pull the pulling bar (33) to move toward the proximal end of the casing (11). The latch plate (31) is retracted inside the chamber (112) by the pulling block (331) of the pulling bar (33) pushing against the holding block (322) of the transmitting lever (32). Thus, users can open the glass door when the latch head (311) of the latch plate (31) is retracted into the chamber (112) of the casing (11).

When the user releases the handles (462), the operating member (20) can be returned to the original position with the recoil forces provided by the first spring (205), the second spring (319) and the third spring (334) and the latch head (311) of the latch plate (31) extends out the casing (11) from the opening (111).

Figure 6:
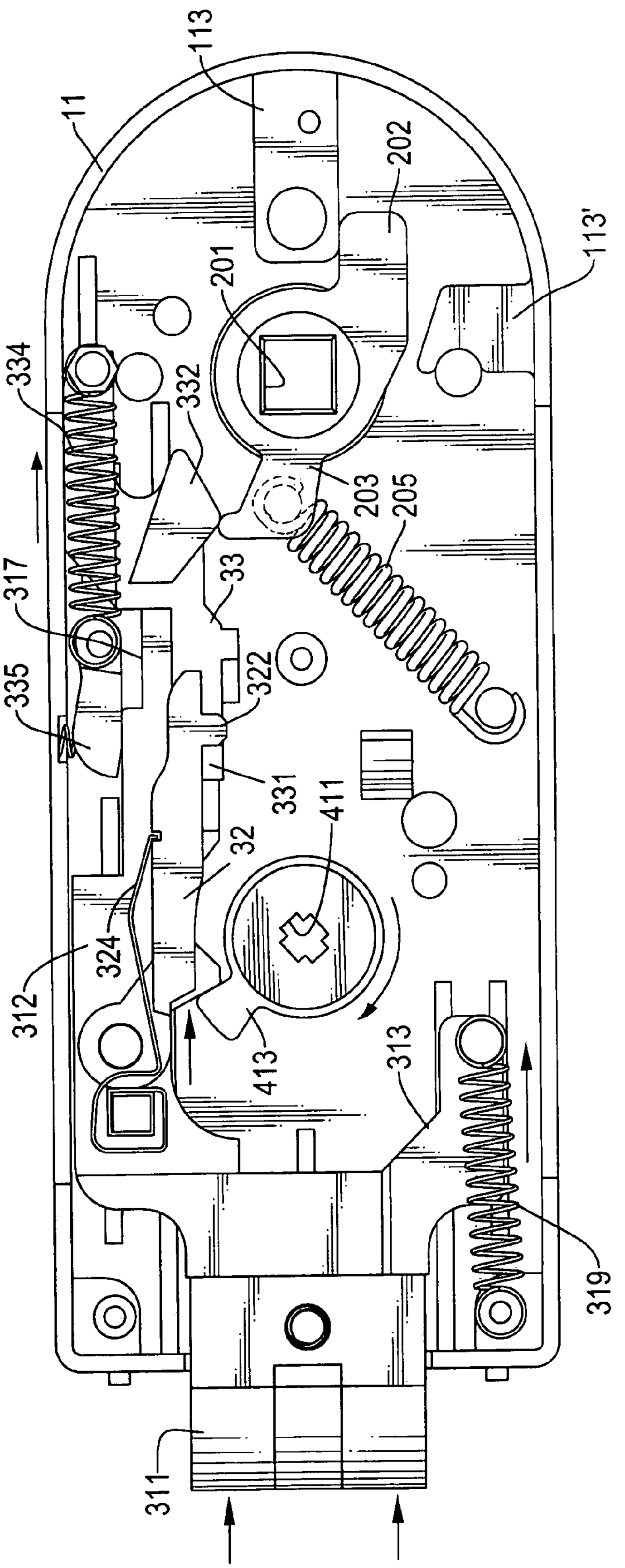
FIG. 6 is an operational top view of the latch locking apparatus in FIG. 4 showing the lock device of the latch locking apparatus being rotated in clockwise.

With reference to FIG. 6, when a key is inserted into one of the lock cylinders (45) and the rotating ring (412) is rotated clockwise by the key, the locking protrusion (413) abuts and pushes against the upper tail (312). Consequently, the latch head (311) of the latch plate (31) will be retracted into the chamber (112) of the casing (11). Thus, the user can open the glass door with the key and the latch plate (31) will return to the original location with the recoil force provided by the second spring (319) when the user releases the key.

Figure 7:
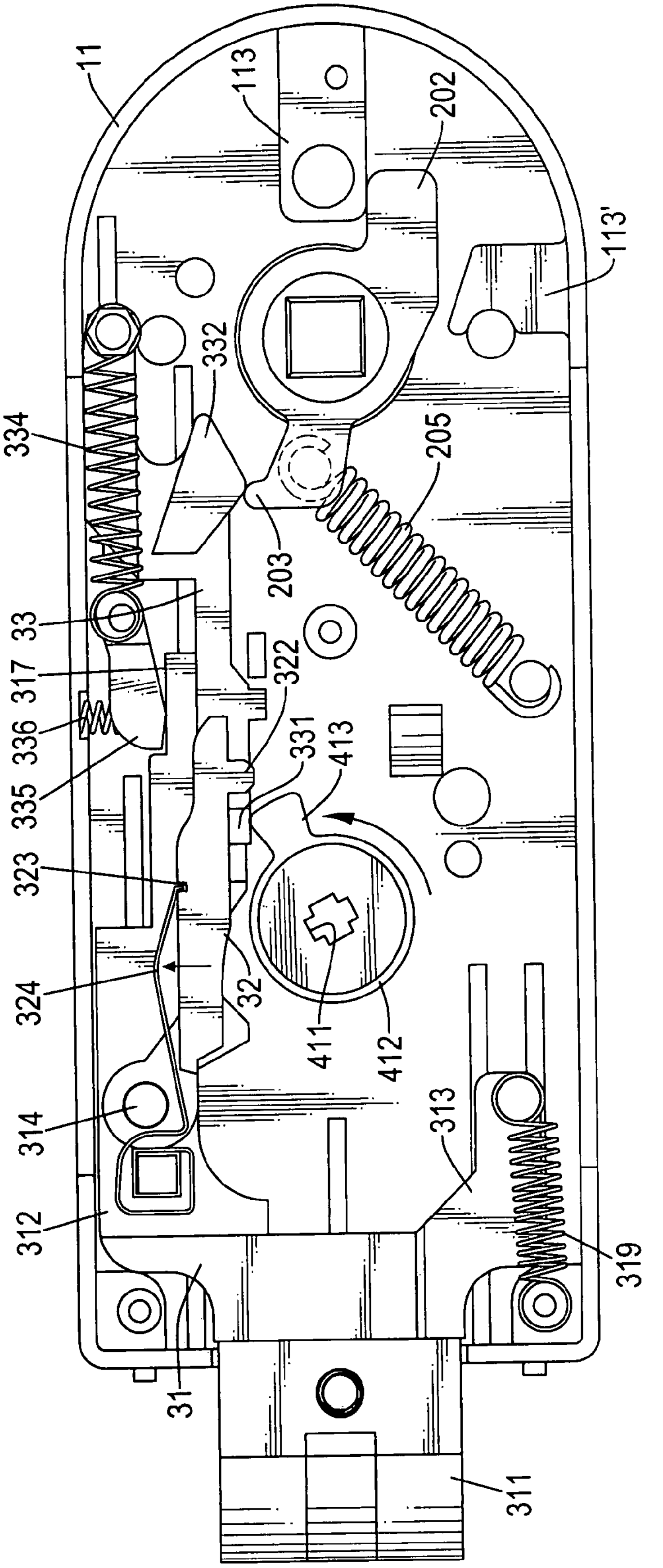
FIG. 7 is an operational top view of the latch locking apparatus in FIG. 4 showing the lock device of the latch locking apparatus being rotated in counterclockwise.
Figure 8:
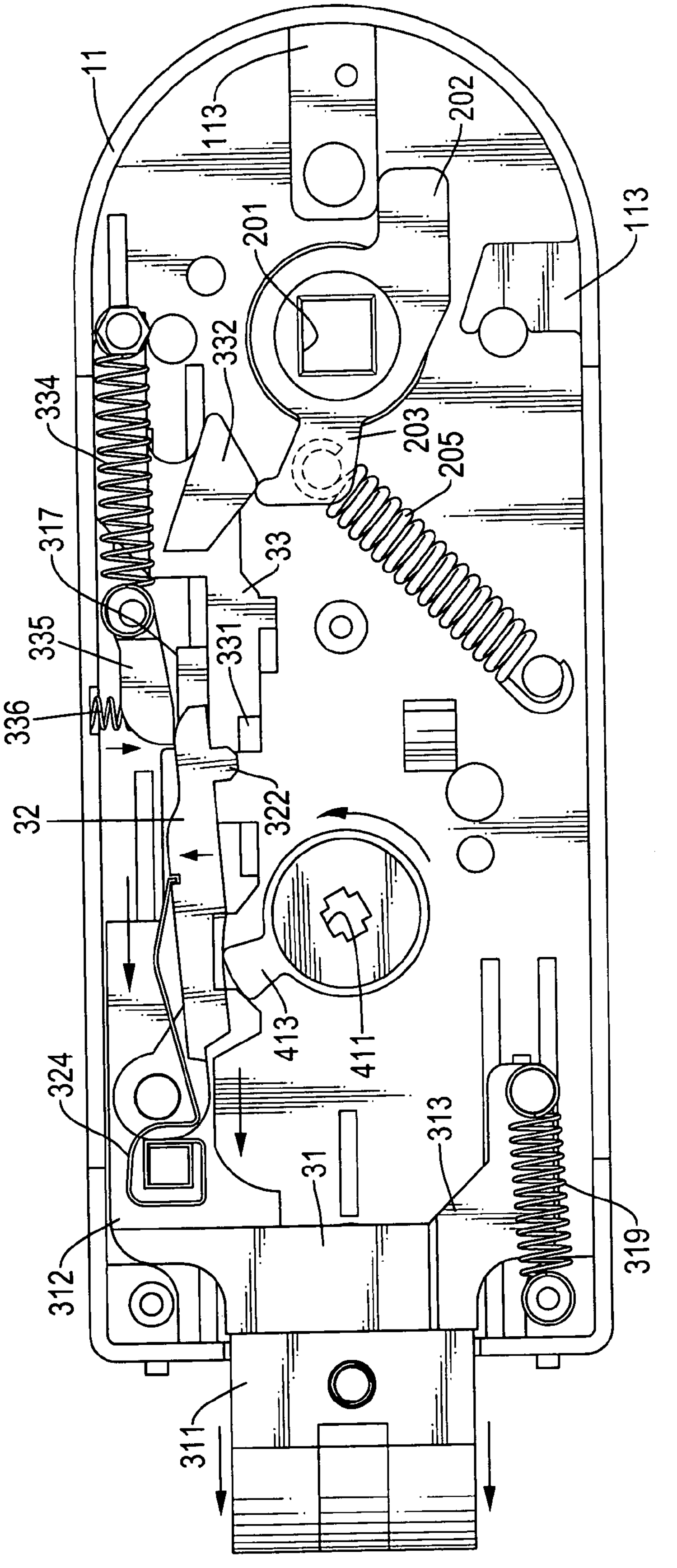
FIG. 8 is another operational top view of the latch locking apparatus in FIG. 4 showing the lock device of the latch locking apparatus being rotated in counterclockwise.

With further reference to FIGS. 7 and 8, when the user inserts the key into one of the lock cylinders (45) and rotates the rotating ring (412) counterclockwise, the locking protrusion (413) will abut and push against the transmitting lever (32) to move upward relative to the pulling bar (33). The holding block (322) is stridden over the pulling block (331) as shown in FIGS. 7 and 8, and the resilient member (324) will press the transmitting lever (32) to abut with the pulling block (331) of the pulling bar (33). When the holding block (322) strides over the pulling block (331), the latch plate (31) is moved to the distal end of the casing (11) by the second spring (319), and the engaging block (335) is engaged with the upper tail (312) in the latch recess (317) to keep the latch plate (31) from moving backward. Accordingly, the latch locking apparatus is in a locked condition.

Figure 9:
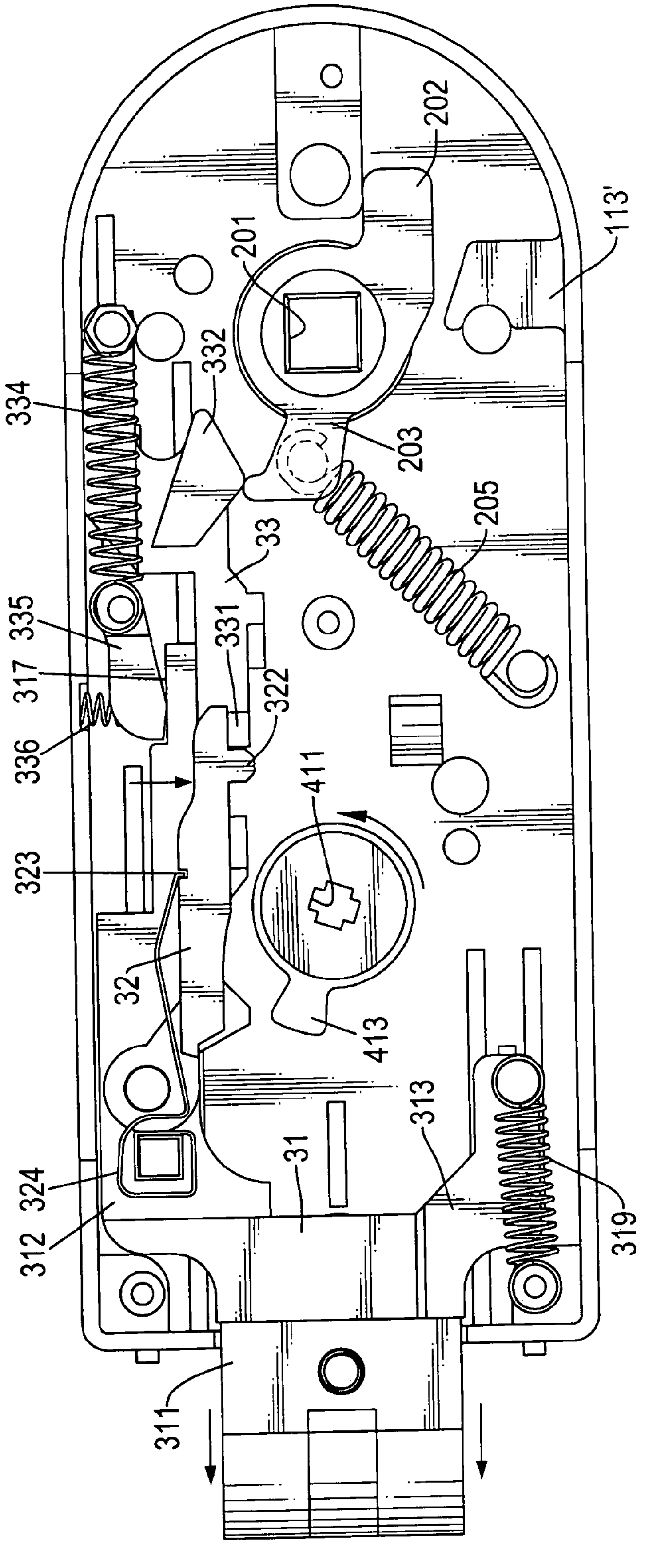
FIG. 9 is an operational top view of the latch locking apparatus in FIG. 4 showing the lock of the latch locking apparatus being rotated in counterclockwise.
Figure 10:
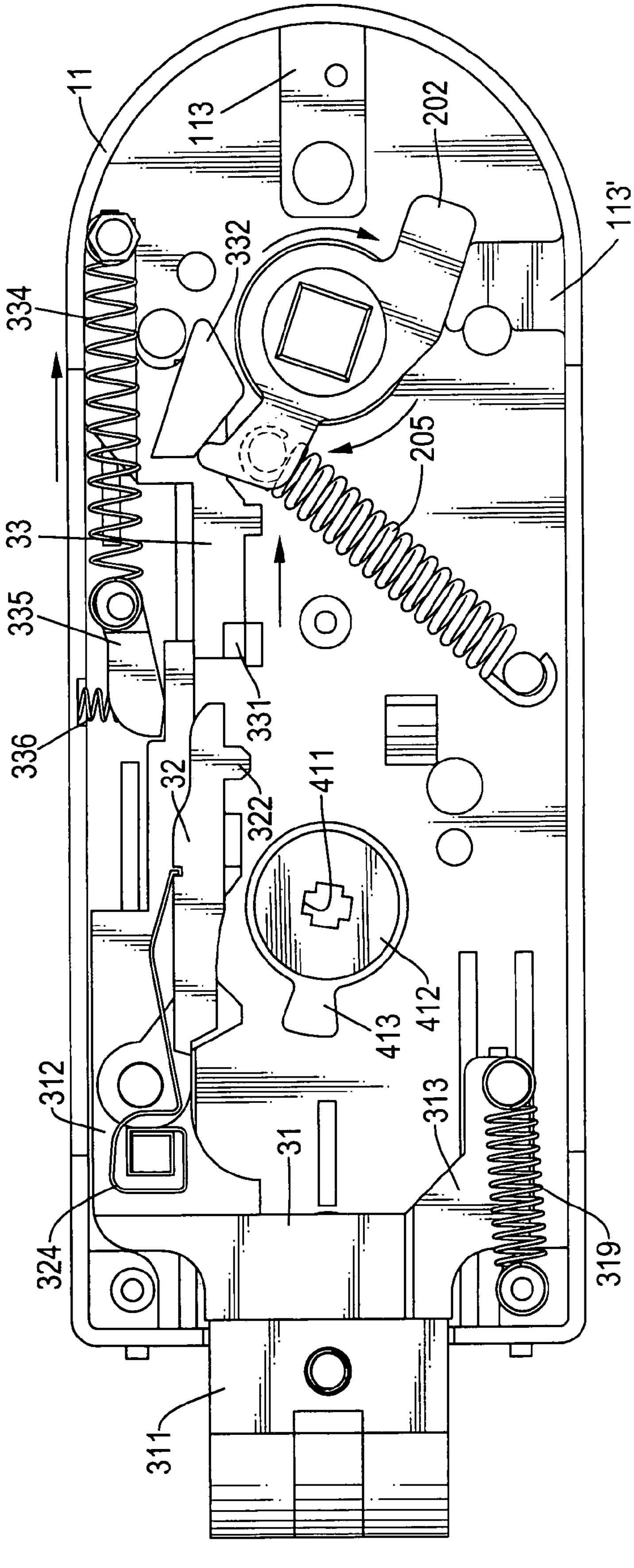
FIG. 10 is another operational top view of the latch locking apparatus in FIG. 4 showing the operating member of the latch locking apparatus being rotated.
Figure 11:
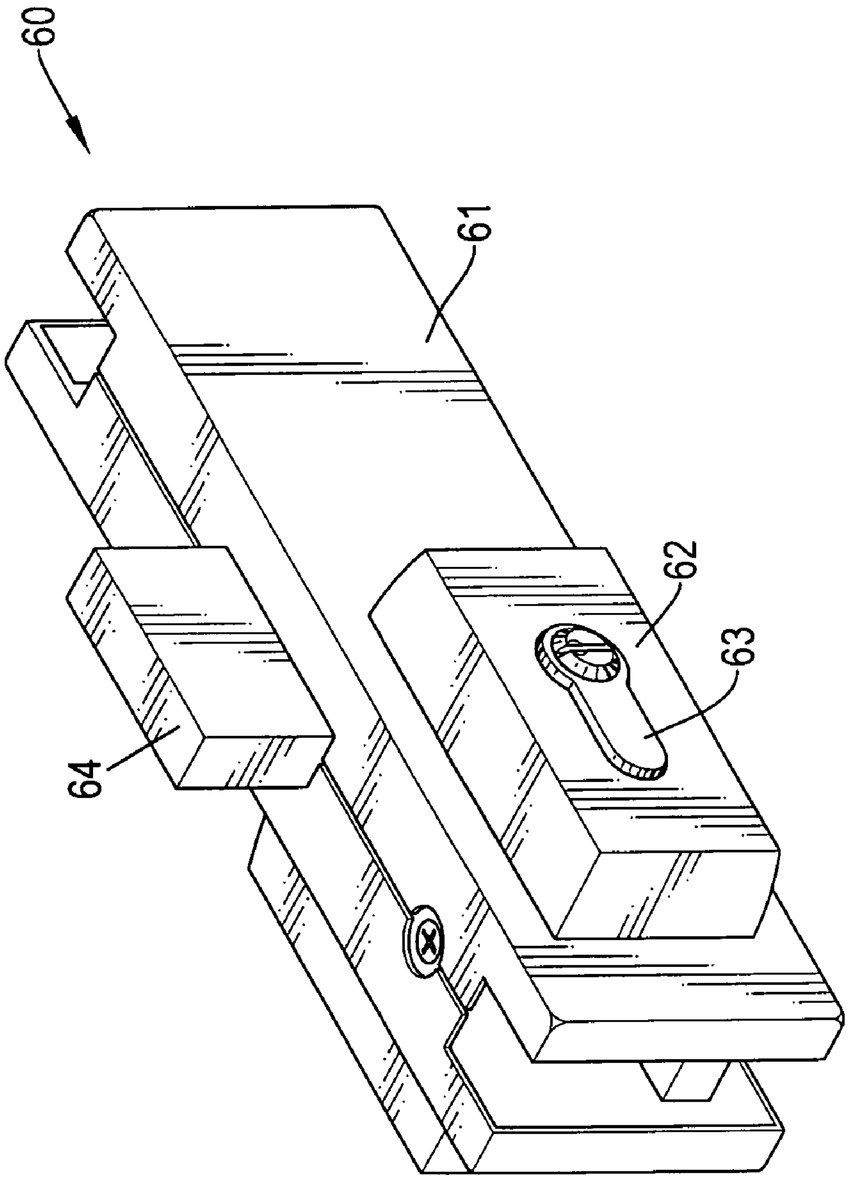
FIG. 11 PRIOR ART
FIG. 11 is a perspective view of a latch locking apparatus for a frameless glass door in accordance with the prior art.

With reference to FIG. 9, because the transmitting lever (32) is separated from the pulling bar (33), the latch plate (31) will not be retracted into the chamber (112) by rotating the handles (462) to keep the latch locking apparatus with the glass door at a locked condition.

The latch locking apparatus has the following advantages.

1. The operating member (20) of the latch locking apparatus can be actually returned to the original location with the recoil forces provided by the first spring (205) even when the handles (462) has a heavy weight, and the second spring (319) and the third spring (334) can pull the latch head (311) of the latch plate (31) moving out the casing (11) from the opening (111).

2. Furthermore, the pulling arm (203) of the operating member (20) always contacts with the pressing block (332) of the pulling bar (33), so the transmitting device (30) can move forwards and backwards smoothly in the body (10) and will not be impeded by the operating member (20). Consequently, the useful life of the latch locking apparatus is prolonged.

3. The moving travel of the transmitting device increases with the arrangement of the pulling bar (33), the transmitting lever (32) and the latch plate (31). Then, the glass door can be locked with the lock apparatus securely and safely, and this prevents unauthorized people from accessing through the glass door.

4. When the lock device (40) is unlock, users can rotate the handles (462) to move the latch head (311) and open or close the latch locking apparatus with the glass door, and this is convenient in use.

5. Users can hold the glass door in a close position without locking the lock device (40).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A latch locking apparatus comprising
a body having
a casing having
an open top;
a closed bottom;
a lower sidewall;
an upper sidewall;
a distal end;
a proximal end;
a chamber being defined in the casing between the open top and the closed bottom;
an opening being formed through distal end of the casing;
a mounting hole being formed through the closed bottom of the casing near the proximal end;
a connecting hole being formed through the closed bottom of the casing between the opening and the mounting hole; and
a lower mounting post being formed on the closed bottom of the casing near the lower sidewall;
an operating member being mounted rotatably in the mounting hole in the casing of the body and having
a front end;
a pulling arm being formed on the front end of the operating member and having a bottom;
a mounting post being formed on the bottom of the pulling arm; and
a first spring being connected between the mounting post on the pulling arm and the lower mounting post on the casing;
a transmitting device being mounted in the casing, being connected to the operating member and having
a latch plate being mounted moveably in the chamber and having
a latch end;
a mounting end;

a latch head being formed on the latch end of the latch plate and extending out the casing from the opening;
an upper tail being formed on the mounting end of the latch plate at a position near the upper sidewall of the casing; and
a lower tail being formed on the mounting end of the latch plate at a position near the lower sidewall of the casing and having
a top;
a distal end; and
a lower connecting post being formed on the top of the lower tail, and
a locking device being connected to the body and the operating member and having
a lock cam being connected to the connecting hole of the casing between the latch plate and the operating member and having
a rotating ring being mounted rotatably on the lock cam;
a center;
a through hole being formed through the center of the lock cam; and
a locking protrusion being formed on the rotating ring and selectively abutting one of the upper tail of the latch plate and the transmitting lever of the transmitting device;
two lock cylinders being respectively mounted with the lock cam and each lock cylinder having
an outer end; and
a cap being mounted around the corresponding outer end of the lock cylinder; and
a handles device being attached to the body and the operating member and having two handles.

2. The latch locking apparatus as claimed in claim 1, wherein
the latch plate further has a second spring being connected between the casing and the lower connecting post on the lower tail; and
the transmitting device further has
a transmitting lever being connected to the latch plate and being located near the upper sidewall of the casing; and
a pulling bar being mounted in the chamber of the casing, being connected to the transmitting lever and the operating member and having a third spring being connected between the pulling bar and the casing.

3. The latch locking apparatus as claimed in claim 2, wherein
the upper tail of the latch plate has
a top; and
an upper connecting post being formed on the top of the upper tail; and
a mounting protrusion being formed on the top of the upper tail between the upper connecting post and the latch head; and
the transmitting lever has
a proximal end being connected to the upper connecting post of the upper tail;
a distal end;
a lower side;
an upper side;
a connecting hole being formed in the proximal end of the transmitting lever and being mounted around the upper connecting post;
a holding block being formed on the lower side of the transmitting lever;
an inserting recess being formed in the upper side of the transmitting lever and facing to the upper sidewall of the casing; and
a resilient member being connected between the mounting protrusion on the upper tail and the inserting recess in the transmitting lever.

4. The latch locking apparatus as claimed in claim 3, wherein
the casing further has
an upper mounting post being formed on the closed bottom of the casing near the upper sidewall and between the mounting hole and the connecting hole; and
a recess being defined in the upper sidewall of the casing at a position near the upper mounting post; and
the upper tail of the latch plate has
a distal end; and
a latch recess being formed in the distal end of the upper tail and facing to the recess in the casing;
the pulling bar has
a distal end;
a proximal end;
a pulling block being formed on the distal end of the pulling bar and abutting with the holding block of the transmitting lever;
a pressing block being formed on the pulling bar and abutting with the pulling arm of the operating member;
a mounting shaft being formed on the proximal end of the pulling bar, and the third spring being connected between the mounting shaft and the upper mounting post on the casing;
an engaging block being connected to the upper mounting post on the casing and selectively engaging with the upper tail of the latch plate; and
a spring being mounted in the recess in the casing and pressing against the engaging block to engage with the upper tail of the latch plate.

5. The latch locking apparatus as claimed in claim 4, wherein
the body further has a cover being attached to and closing the open top of the casing and having
a through hole being formed through the cover and aligning with the connecting hole in the casing; and
a connecting hole being formed through the cover and aligning with the mounting hole in the casing; and
the operating member has
a center; and
a mounting hole being formed through the center of the operating member and aligning with the mounting hole in the casing and the through hole in the cover.

6. The latch locking apparatus as claimed in claim 5, wherein
the casing has
an upper restricting block being formed on the closed bottom of the casing at the proximal end of the casing;
a lower restricting block being formed on the closed bottom of the casing near the lower sidewall; and
the operating member further has a restricting arm being formed on the rear end of the operating member and located between the restricting blocks on the casing.

7. The latch locking apparatus as claimed in claim 6, wherein
the lock device further has
a primary housing being mounted around the closed bottom of the casing of the body and having a mounting hole being formed though the primary housing and aligning with the mounting hole in the casing; and a connecting hole being formed though the primary housing and aligning with the connecting hole in the casing;

a second housing being mounted around the cover of the body and having a mounting hole being formed though the second housing and aligning with the though hole in the cover; and a connecting hole being formed though the second housing and aligning with the connecting hole in the cover;

a connecting slab being connected to the body between the cover and the second housing and having a mounting hole being formed though the connecting slab and aligns with the though hole in the cover and the mounting hole in the second housing; and a connecting hole being formed though the connecting slab and aligns with the connecting holes in the cover and the second housing;

the lock cylinders being respectively mounted securely in the housings and each lock having an inner end being extended into the connecting holes of the housings, being connected to the through hole of the lock cam;

the handles device being attached to the housings, the body and the operating member and having a mounting post being extended through the mounting holes of the housings, the connecting slab, the casing and the operating member and the through hole of the cover with two ends; and the handles being connected to the mounting post and each handle having a proximal end being connected to one of the ends of the mounting post; and a distal end.

* * * * *